(12) United States Patent
Fujimatsu et al.

(10) Patent No.: US 9,600,732 B2
(45) Date of Patent: Mar. 21, 2017

(54) IMAGE DISPLAY APPARATUS AND IMAGE DISPLAY METHOD (75) Inventors: Takeshi Fujimatsu, Kanagawa (JP); Mikio Morioka, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 214 days.

(21) Appl. No.: 14/123,771

(22) PCT Filed: May 30, 2012

(86) PCT No.: PCT/JP2012/003534
§ 371 (c)(1),
(2), (4) Date: Dec. 4, 2013

(87) PCT Pub. No.: WO2012/169149
PCT Pub. Date: Dec. 13, 2012

(65) Prior Publication Data
US 2014/0098996 A1    Apr. 10, 2014

(30) Foreign Application Priority Data

Jun. 7, 2011   (JP) .................................. 2011-127186

(51) Int. Cl.
*G06K 9/32* (2006.01)
*G06T 7/20* (2006.01)
*G06T 7/00* (2006.01)

(52) U.S. Cl.
CPC ............ *G06K 9/3241* (2013.01); *G06T 7/004* (2013.01); *G06T 7/2053* (2013.01); *G06T 2207/10016* (2013.01); *G06T 2207/30232* (2013.01)

(58) Field of Classification Search
CPC .... G01S 3/7864; G08B 13/1961; H04N 5/232
See application file for complete search history.

(56) References Cited

U.S. PATENT DOCUMENTS

| 2009/0296989 A1 | 12/2009 | Ramesh et al. |
| 2010/0141772 A1* | 6/2010 | Inaguma ............... G01S 3/7864 348/169 |
| 2012/0178469 A1* | 7/2012 | Grzechnik ........... G01C 21/005 455/456.1 |

FOREIGN PATENT DOCUMENTS

| EP | 2 131 328 | 12/2009 |
| JP | 2004-007174 | 1/2004 |

(Continued)

OTHER PUBLICATIONS

Cheung, Sen-Ching, S. and Chandrika Kamath. "Robust techniques for background subtraction in urban traffic video." Electronic Imaging 2004. International Society for Optics and Photonics, 2004.*

(Continued)

*Primary Examiner* — Siamak Harandi
*Assistant Examiner* — Raphael Schwartz
(74) *Attorney, Agent, or Firm* — Greenblum & Bernstein, P.L.C.

(57) ABSTRACT

An image display apparatus is provided that can obtain a stable and easy to view detection frame and cut-out image in a captured image in which there is a possibility that a congested region and a non-congested region are mixed, such as an omnidirectional image. Congested region detecting section detects a congested region in a captured image by detecting a movement region of the captured image. Object detecting section detects images of targets in the captured image by performing pattern matching. Detection frame forming section forms a congested region frame that surrounds a congested region detected by congested region detecting section, and object detection frame that surround image of target detected by object detecting section.

13 Claims, 9 Drawing Sheets

(56) References Cited

FOREIGN PATENT DOCUMENTS

| | | |
|---|---|---|
| JP | 2007-068008 | 3/2007 |
| JP | 2009-110054 | 5/2009 |
| JP | 2009-110152 | 5/2009 |
| JP | 2010-102596 | 5/2010 |

OTHER PUBLICATIONS

McKenna, Stephen J., et al. "Tracking groups of people." Computer Vision and Image Understanding 80.1 (2000): 42-56.*
China Search Report (English language translation), which is an annex to China Office Action mailed Jul. 20, 2015, for the corresponding Chinese Patent Application.
Lan Dong et al., "Fast Crowd Segmentation Using Shape Indexing", Computer Vision, 2007. ICCV 2007. IEEE 11th International Conference 0 N, IEEE, PI, XP031194564, Oct. 1, 2007, pp. 1-8.
Masataka Doi et al., "Real-time Vision System for Autonomous Mobile Robot", Robot and Human Interactive Communication, 2001, Proceedings, 10th IEEE International Workshop on Sep. 18-21, 2001, XP010576334, Sep. 18, 2001, pp. 442-449.
Si Wu et al., "A Shape Derivative Based Approach for Crowd Flow Segmentation", Lecture Notes in Computer Science, Springer, DE, XP019141362, Sep. 23, 2009, pp. 93-102.
International Search Report, mailed Aug. 22, 2012, for corresponding International Application No. PCT/JP2012/003534.
Written Opinion, mailed May 15, 2013, for corresponding International Application No. PCT/JP2012/003534.

* cited by examiner

☐ OBJECT DETECTION FRAME
⬚ CONGESTED REGION FRAME

□ OBJECT DETECTION FRAME    ⬚ CONGESTED REGION FRAME

□ OBJECT DETECTION FRAME   ⊡ CONGESTED REGION FRAME

IMAGE DISPLAY APPARATUS AND IMAGE DISPLAY METHOD

TECHNICAL FIELD

The present invention relates to an image display apparatus and an image display method that detect a person in a captured image that is obtained by, for example, a surveillance camera, display the person in a manner in which the person is surrounded by a detection frame, and also cut out and display an image of the person. In particular, this invention is technology that is favorably applied to a captured image in which a congested region exists.

BACKGROUND ART

Some conventional video cameras such as surveillance cameras and vehicle-mounted cameras have an automatic tracking function that automatically tracks a target image such as a person. In order to automatically track an object, it is necessary to detect the object. In a congested region in which objects are close together, the detecting accuracy decreases due to hindrance caused by closeness of objects. Hence, in a congested region, automatic tracking may be lost or the accuracy of automatic tracking may noticeably decrease.

Patent Litrature 1 discloses an automatic tracking apparatus that avoids impractical tracking and lowers the possibility of erroneous tracking by selecting a non-tracking mode for an image with respect to which it is difficult to perform tracking, such as an image of a congested region, and capturing an image of a designated fixed area.

CITATION LIST

Patent Literature

[PTL 1]
  Japanese Patent Application Laid-Open No. 2007-068008
[PTL 2]
  Japanese Patent Application Laid-Open No. 2009-110054
[PTL 3]
  Japanese Patent Application Laid-Open No. 2009-110152

SUMMARY OF INVENTION

Technical Problem

The technology described in Patent Litrature 1 is technology that assumes automatic tracking in a so-called "PTZ camera" that has pan, tilt and zoom functions. Therefore, the photographing range is limited. For example, when people are present that are performing a plurality of different movements, if a certain person is tracked while performing pan, tilt and zoom (PZT) operations, there is a high possibility that another person who is performing a different movement to that certain person will no longer be in the photographing angle of view. Further, when the technology described in Patent Litrature 1 is adopted, if a person appears in a location that is separate from a congested region, there is a high possibility that the person will fall outside the photographing angle of view.

In contrast, when a target image is detected from an image obtained by a camera that captures an image of a wide area, such as an omnidirectional camera, the detected image is surrounded with a detection frame and tracked, and electronic PTZ is performed and the detected image is cut out, it is possible to avoid the above described disadvantage that a certain target falls outside the angle of view.

However, with respect to an image that is obtained by a camera which captures an image of a wide area, such as an omnidirectional camera, and that includes a congested region, heretofore, adequate studies have not been conducted regarding how to form a detection frame and how to cut out an image so that a stable and easy to view image can be obtained.

The present invention has been conceived in view of the above described situation, and an object of the present invention is to provide an image display apparatus and an image display method that, with respect to a captured image for which there is a possibility that a congested region and a non-congested region are mixed therein, such as an omnidirectional image, can obtain a stable and easy to view detection frame and cut-out image.

Solution to Problem

One aspect of an image display apparatus according to the present invention includes: a congested region detecting section that detects a congested region in a captured image by detecting a movement region of the captured image; an object detecting section that detects an image of a target in the captured image by performing pattern matching; and a detection frame forming section that forms a congested region frame that surrounds the congested region detected by the congested region detecting section, and an object detection frame that surround the image of the target detected by the object detecting section.

One aspect of the image display apparatus according to the present invention further includes an image cutting-out section that cuts out an image of a region that is surrounded by the congested region frame and an image of a region that is surrounded by the object detection frame from the captured image.

One aspect of an image display method according to the present invention includes: a congested region detection step of detecting a congested region in a captured image by detecting a movement region of the captured image; an object detection step of detecting an image of a target in the captured image by performing pattern matching; and a detection frame formation step of forming a congested region frame that surrounds the congested region detected in the congested region detection step, and object detection frame that surround the image of the target detected in the object detection step.

One aspect of the image display method according to the present invention further includes an image cutting-out step of cutting out an image of a region that is surrounded by the congested region frame and an image of a region that is surrounded by the object detection frame from the captured image.

Advantageous Effects of Invention

According to the present invention, a stable and easy to view detection frame and cut-out image can be obtained by forming detection frames (a congested region frame and an object detection frame) by performing different methods that are suitable for congestion detection and object detection, respectively.

BRIEF DESCRIPTION OF DRAWINGS

FIGS. 2A-2B include drawings that serve to describe distance calculation processing performed by a distance calculating section, in which

DESCRIPTION OF EMBODIMENTS

An embodiment of the present invention is described in detail hereunder with reference to the drawings.

Although in the following embodiment examples are mainly described in which an image of a target is an image of a person, an image of a target is not limited to an image of a person. An image of a target may be, for example, an image of a vehicle or another object.

Figure 1:
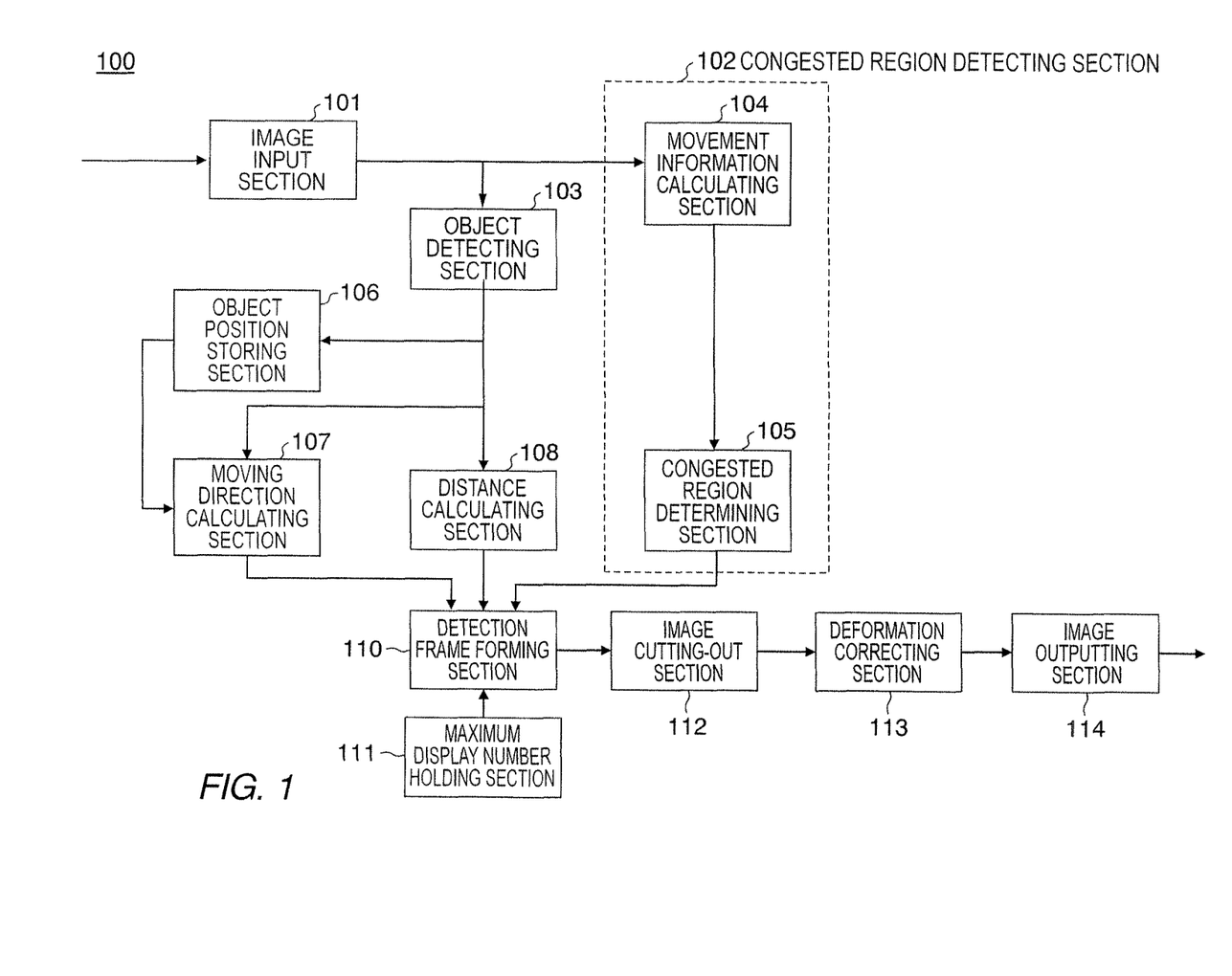
FIG. 1 is a block diagram showing a configuration of an image display apparatus according to an embodiment of the present invention.

FIG. 1 shows a configuration of an image display apparatus according to the present embodiment. In image display apparatus 100, an omnidirectional image that is obtained by an omnidirectional camera is input into image input section 101. In this connection, an image that is input to image input section 101 is not limited to an omnidirectional image, and it is sufficient that the image is a captured image obtained by a wide-angle video camera. Image input section 101 outputs the inputted captured image to congested region detecting section 102 and object detecting section 103.

Congested region detecting section 102 detects a congested region in the captured image by detecting a movement region of the captured image. Congested region detecting section 102 has movement information calculating section 104 and congested region determining section 105. Movement information calculating section 104 calculates an inter-frame difference with respect to the inputted captured image, and determines a region in which a difference value is equal to or greater than a threshold value to be a foreground region (in other words, a movement region). Movement information calculating section 104 outputs information of the determined foreground region (movement region information) to congested region determining section 105.

Congested region determining section 105 performs clustering of information of foreground regions, and determines a region in which a foreground region area is equal to or greater than a threshold value to be a congested region. A method of determining a congested region using movement information in this manner is also described, for example, in Patent Literatures 2 and 3. In this case, when the captured image is an omnidirectional image, preferably the threshold value that is used for determining a congested region changes in accordance with a distance from the center of the omnidirectional image. More specifically, generally, in the case of omnidirectional images, when images of objects that have the same area are captured, the objects are captured as regions that increase in size in accordance with proximity to the image center, and hence the threshold value is preferably set as a value that increases in accordance with proximity to the image center. It is thereby possible to perform congestion degree estimation in an equal manner for all regions. Congested region determining section 105 outputs information regarding a determined congested region to detection frame forming section 110.

Object detecting section 103 detects an image of a target in the captured image by performing pattern matching. In the case according to the present embodiment, since the target is a person, object detecting section 103 detects a person in the captured image by performing pattern recognition processing between a human pattern that is prepared in advance and the captured image. Object detecting section 103 outputs position information of the detected person on the image to object position storing section 106, moving direction calculating section 107, and distance calculating section 108.

Moving direction calculating section 107 calculates a moving direction of each person detected by object detecting section 103. More specifically, with respect to each person, moving direction calculating section 107 calculates a moving direction based on a past position that is stored in object position storing section 106 and a current position that has been newly input. Moving direction calculating section 107 outputs the calculated moving direction of each person to detection frame forming section 110.

Figure 2A:
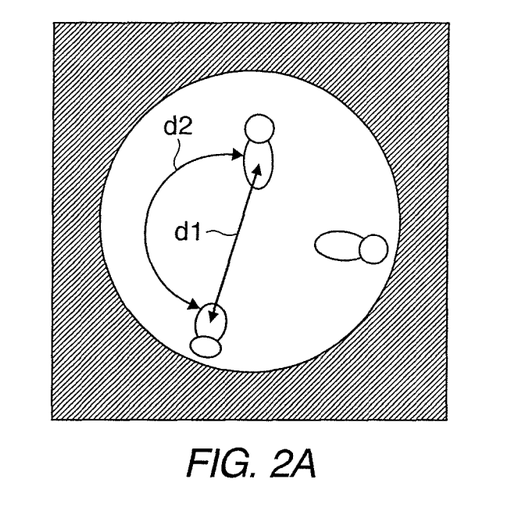
FIG. 2A is a drawing showing distance d1 on an omnidirectional image and distance d2 in a circumferential direction on a panoramic image.
Figure 2B:
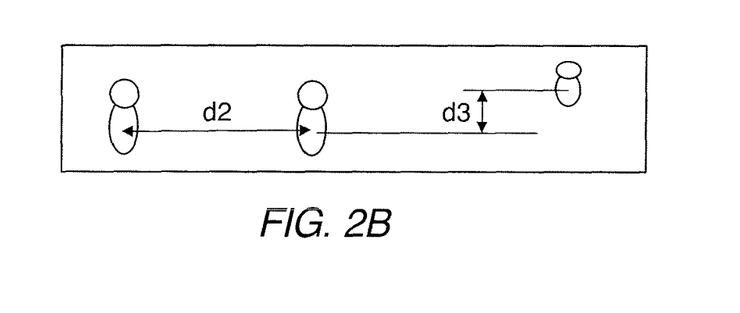
FIG. 2B is a drawing showing the distance d2 in a circumferential direction on the panoramic image and distance d3 in a longitudinal direction on a panoramic image.

Distance calculating section 108 calculates a distance between each person detected by object detecting section 103. Distance calculating section 108, for example, calculates distance d1, d2 or d3 shown in FIG. 2 by any of the methods described in the following i) to iii). More specifically, a calculated distance may be distance d1, distance d2, or distance d3.

i) Distance calculating section 108 calculates distance d1 on an omnidirectional image as shown in FIG. 2A. ii) Distance calculating section 108 calculates distance d2 in a circumferential direction on a panoramic image as shown in FIG. 2A and FIG. 2B. iii) Distance calculating section 108 calculates distance d3 in a longitudinal direction on a panoramic image as shown in FIG. 2B.

Distance calculating section 108 outputs the calculated distance d1, d2 or d3 to detection frame forming section 110.

Detection frame forming section 110 forms a congested region frame that surrounds a congested region detected by congested region detecting section 102, and forms an object detection frame that surrounds an image of a person detected by object detecting section 103.

Detection frame forming section 110 first groups congested regions and detected people. At such time, congested regions are treated as a single group (the same group). Further, in the case of detected people, detected people that have a distance between each other that is less than a threshold value are treated as the same group. Detection frame forming section 110 forms frames that surround the same groups, respectively, as detection frames. That is, a detection frame that surrounds congested regions is formed as a congested region frame, and a frame that surrounds detected people that have a distance between each other that is less than a threshold value is formed as an object detection frame.

In this case, the number of groups into which detection frame forming section 110 groups congested regions and detected people (in other words, the number of frames that are formed) is not greater than a group number that is held by maximum display number holding section 111. That is, when a group number that is held by maximum display number holding section 111 is, for example, 3, the maximum number of groups (maximum number of frames) is 3. In this connection, information that is held by maximum display number holding section 111 is not limited to the maximum number of groups (maximum number of frames), and for example, may also be the maximum frame size.

Detection frame forming section 110 carries out grouping and formation of detection frames according to the following rules.

a) When a congested region that has been detected by congested region detecting section 102 exists, form a congested region frame by assigning a detection frame to the congested region with higher priority than to a person detected by object detecting section 103.

b) With respect to people detected by object detecting section 103, form an object detection frame while grouping the detected people based on distances between the detected people.

c) Among images of people detected by object detecting section 103, form an object detection frame for an image of a person that is outside a congested region frame. In other words, do not form an object detection frame that is contained in a congested region frame.

d) Include a person that is moving in a direction of a congested region within the same detection frame as the congested region. Alternatively, if there is a person who is moving in the direction of a congested region, gradually include the moving person in the same detection frame as the congested region by gradually enlarging the size of the detection frame of the congested region in the direction of the moving person.

The reason why frame forming section 110 is configured to form a congested region frame with priority over an object detection frame, as in the above described a) and c), is that detection in a congested region becomes unstable when detection of a person using pattern matching is performed by means of the object detecting section. In other words, for a congested region, by forming a congested region frame without performing individual tracking for which detection is unstable (that is, without forming an individual tracking frame), it is possible to perform formation of a stable and easy to view detection frame and cutting out of an image.

Further, by employing the rule described in the above b), it is possible to suppress an unnecessary increase in the number of object detection frames, and an easy-to-view object detection frame and cut-out image can be obtained.

In addition, by employing the rule described in the above d), when an image is cut out along a congested region frame, a cut-out image in which the positional relationship between a congested region and a moving person is easy to understand can be obtained.

In this connection, the size of a detection frame may change in accordance with the number of detection frames or the like, or the size of a detection frame may be fixed. Detection frame forming section 110 outputs information regarding detection frame that has been formed to image cutting-out section 112.

Image cutting-out section 112 cuts out an image along a detection frame. Thus, a cut-out image of each region that is surrounded by a detection frame is obtained. Image cutting-out section 112 outputs each cut-out image to deformation correcting section 113.

Deformation correcting section 113 subjects each cut-out image to deformation correction processing, and outputs cut-out image that have undergone deformation correction to image outputting section 114. More specifically, an image that has been cut out from an omnidirectional image is photographed in a manner such that the size of the image increases in accordance with proximity to the center of the omnidirectional image, and therefore deformation correcting section 113 performs deformation correction processing that enlarges the image in accordance with the proximity thereof to the periphery while interpolating pixels.

Image outputting section 114 performs processing that adjusts the orientation of cut-out images that have undergone deformation correction processing, and processing that adjusts the arrangement of cut-out images on a screen or the like, and outputs images that have undergone such processing to a monitor.

Figure 3:
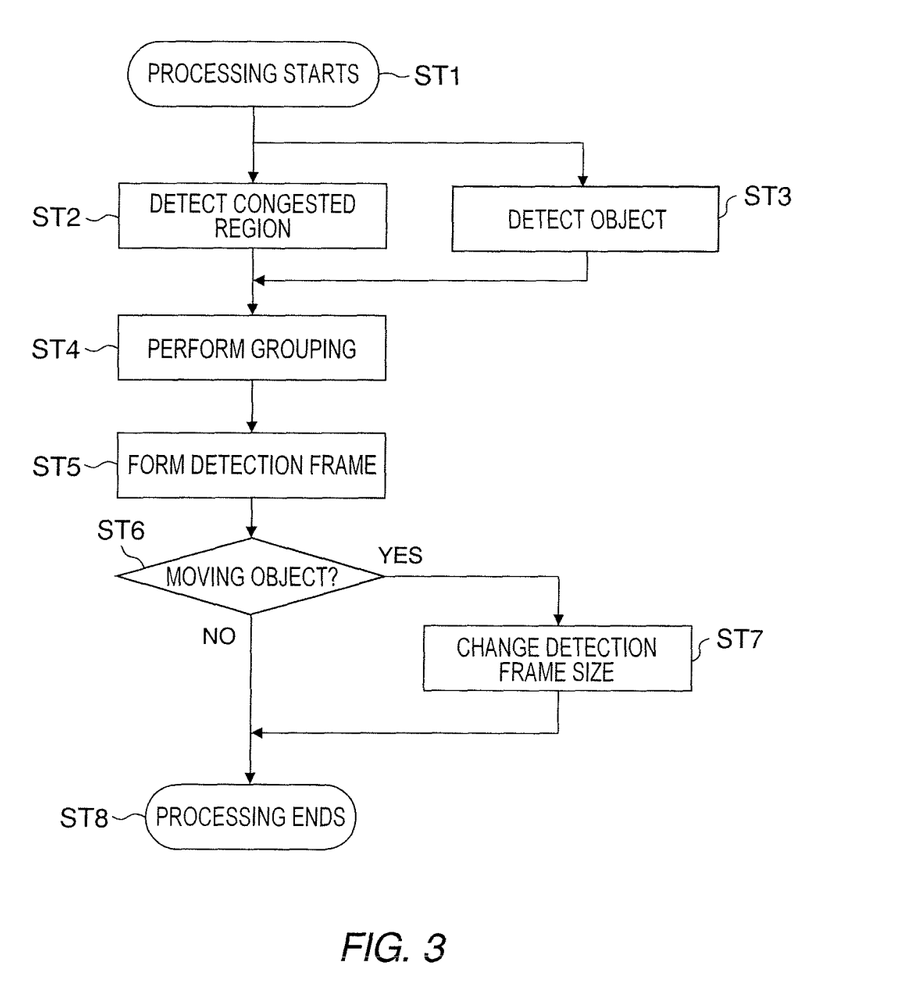
FIG. 3 is a flowchart that serves to describe an operation to form detection frames that is executed by an image display apparatus.

FIG. 3 is a flowchart that serves to describe an operation to form detection frames that is executed by image display apparatus 100.

In image display apparatus 100, after processing is started in step ST1, congested region determining section 105 determines a congested region in step ST2, and object detecting section 103 detects people in step ST3. Next, in step ST4, detection frame forming section 110 performs grouping based on congested region information and information regarding distances between people. In step ST5, detection frame forming section 110 forms detection frames. Subsequently, in step ST6, detection frame forming section 110 determines whether or not each of the detected people is moving, and if it is determined that a detected person is moving, the operation shifts to step ST7 in which the size of the detection frame of the congested region is enlarged in the direction of the moving person. Image display apparatus 100 ends the processing to form detection frames in step ST8.

Next, detection frames that are formed by detection frame forming section 110 are described using FIG. 4 and FIG. 5. FIG. 4 illustrates an example in a case in which a moving person is not present. FIG. 5 illustrates an example in a case in which a moving person is present. In this connection, in the examples illustrated in FIG. 4 and FIG. 5, it is assumed that the distance d2 in a circumferential direction on a panoramic image as described in FIG. 2A and FIG. 2B is used as a distance between people. Further, it is assumed that the number of groups that is held by maximum display number holding section 111 (that is, the maximum number of frames) is 3.

Figure 4A:
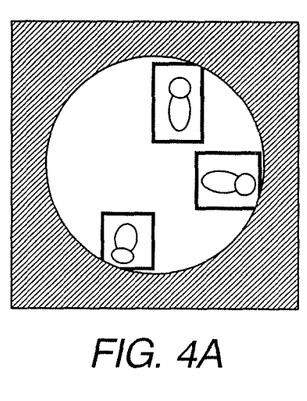
FIGS. 4A-4D include drawings showing examples of detection frames formed by a detection frame forming section.

FIG. 4A shows an example in which distances between three people are all equal to or greater than a predetermined value. In this case, the respective people are grouped into separate groups, and are surrounded by separate detection frames (object detection frames).

Figure 4B:
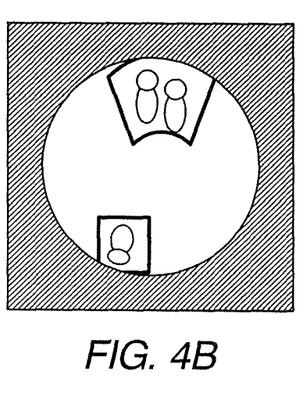
Figure 4C:
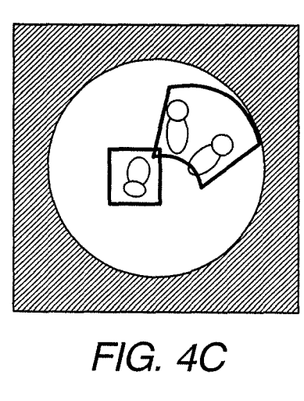

FIG. 4B shows an example in which a distance between two people is less than a predetermined value, and a distance from the aforementioned two people to another person is equal to or greater than the predetermined value. In this case, two people are grouped in the same group, and are surrounded by the same detection frame. The other person is grouped in a separate group and is surrounded by a separate detection frame. FIG. 4C shows an example in which, similarly to FIG. 4B, grouping has been performed into a group of two people and a group of one person. In FIG. 4C, although the distance d1 on the omnidirectional image as shown in FIG. 2A is small, the distance d2 in the circumferential direction on the panoramic image as shown in FIG. 2A and FIG. 2B is equal to or greater than a predetermined value, and therefore one person is grouped into a separate group to the other two people.

Figure 4D:
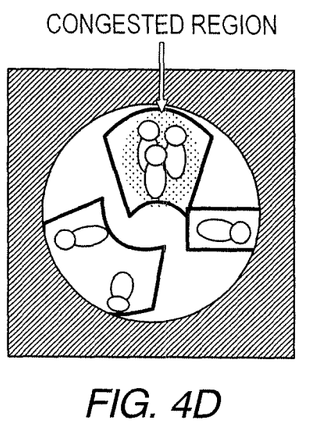
Figure 5A:
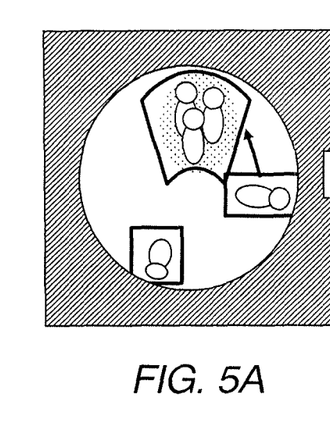
FIGS. 5A-5D include drawings that show examples of detection frames formed by the detection frame forming section, and particularly drawings that show examples in a case where there is a moving person.
Figure 5B:
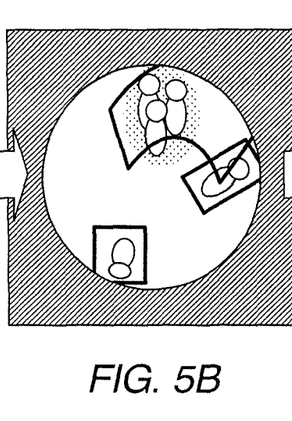
Figure 5C:
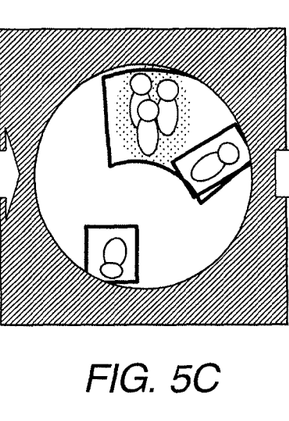
Figure 5D:
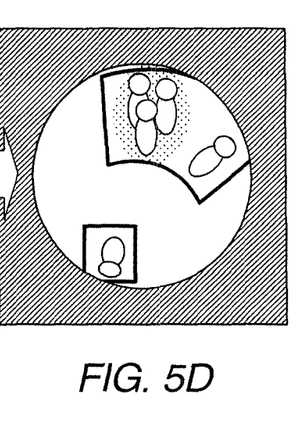

FIG. 4D shows an example of a case in which there is a mixture of a congested region and non-congested regions. The congested region is determined to be the same group and is surrounded by a detection frame with priority over the other regions. With respect to the people detected in the regions other than the congested region, a distance between two people is less than a predetermined value, and a distance from the aforementioned two people to another person is greater than or equal to the predetermined value. Hence, the two people are grouped into the same group and are surrounded by the same detection frame, and the other person is grouped into a separate group and is surrounded by a separate detection frame.

Next, an example in which there is a congested region and a moving person is described using FIG. 5. As shown in FIG. 5A, the congested region is surrounded by a congested region frame, and people detected in regions outside the congested region are surrounded by object detection frames. In this case, as shown by an arrow, one person is moving in a direction approaching the congested region. At that time, as shown in FIG. 5B, the congested region frame is enlarged in the direction of the approaching person. In due course, as shown in FIG. 5C, the moving person enters the congested region frame. As shown in FIG. 5D, when the object detection frame of the moving person is completely contained in the congested region frame, the object detection frame of the moving person is erased. More specifically, tracking of the moving person ends.

Next, examples of display images obtained by image display apparatus 100 of the present embodiment are described. For the display image examples described below, it is assumed that a configuration is adopted in which a screen is divided into four parts, an omnidirectional image is displayed in a left-upper part of the thus-divided screen, and cut-out images are displayed in the other three parts of the divided screen.

<First display image example>

FIG. 6 illustrates a first display image example. Detection frames are displayed in an omnidirectional image. In this case, for example, a congested region frame and an object detection frame are displayed in different colors so as to be distinguishable from each other. In the drawings, for convenience, an object detection frame is shown by a solid line and a congested region frame is shown by a dotted line. In this connection, since an object detection frame moves accompanying movement of an object, an object detection frame can also be referred to as a "tracking frame".

FIG. 6A, FIG. 6B, FIG. 6C, FIG. 6D and FIG. 6E show frame images in a time series that change sequentially in that order.

Figure 6A:
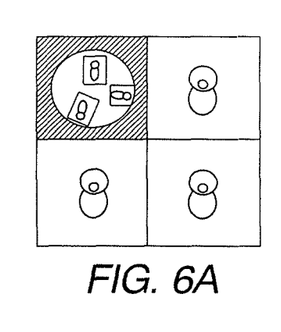
FIGS. 6A-6E include drawings that illustrate a first display image example according to the image display apparatus of the embodiment.
Figure 6B:
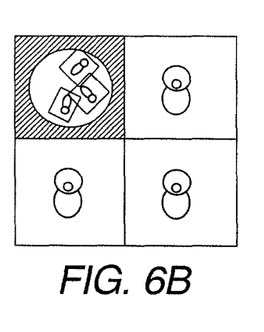

In FIG. 6A and FIG. 6B, three people are detected by object detecting section 103, three object detection frames are formed, and three cut-out images are displayed.

Figure 6C:
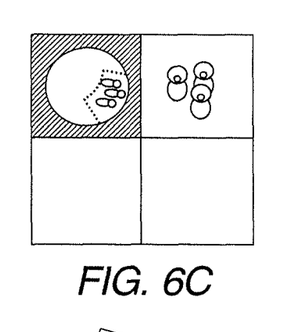

In contrast, in a state shown in FIG. 6C, a congested region is detected, a congested region frame is formed, and an image contained in the congested region frame is displayed as a cut-out image.

Figure 6D:
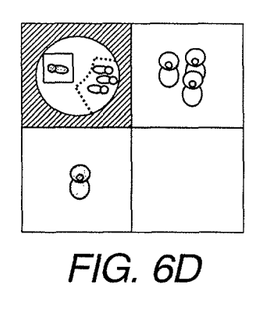

In a state shown in FIG. 6D, a person appears in a non-congested region, a new object detection frame that surrounds the person is formed, and an image contained in the detection frame is displayed as a cut-out image.

Figure 6E:
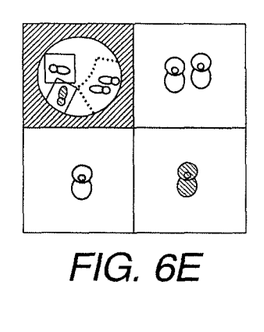

In a state shown in FIG. 6E, one person moves from the congested region to a non-congested region, the person is detected by object detecting section 103, a new object detection frame is formed that surrounds the person, and an image contained in the detection frame is displayed as a cut-out image.

<Second display image example>

FIG. 7 illustrates a second display image example. The display image example illustrated in FIG. 7 is an example in which there is a person who is moving in the direction of a congested region.

Figure 7A:
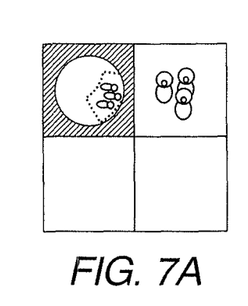
FIGS. 7A-7G include drawings that illustrate a second display image example according to the image display apparatus of the embodiment.
Figure 7B:
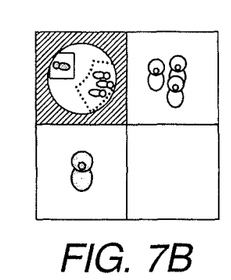

In a state shown in FIG. 7A, a congested region is detected, a congested region frame is formed, and an image contained in the congested region frame is cut out and displayed. In a state shown in FIG. 7B, a person appears in a non-congested region, a new object detection frame is formed that surrounds the person, and an image contained in the object detection frame is displayed as a cut-out image.

Figure 7C:
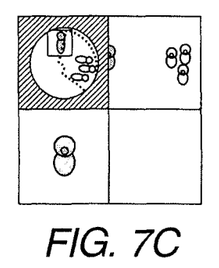
Figure 7D:
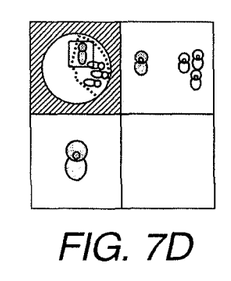

In states shown in FIG. 7C and FIG. 7D, it is detected that the person in the non-congested region is moving in the direction of the congested region, and hence the congested region frame is enlarged in the direction of the moving person. As a result, as will be understood from the right-upper part of the divided screen in FIG. 7C and FIG. 7D, since the moving person is displayed in a corner of the image of the congested region, image display can be performed in which the positional relationship between the congested region and the moving person is easy to understand.

Figure 7E:
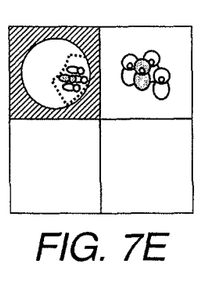

FIG. 7E shows a state in which the moving person has completely entered the congested region frame (in reality, a state in which the object detection frame of the moving person has completely entered the congested region frame). In this state, display of an object detection frame of the moving person has ended, and display of a separate cut-out image for the person has also ended.

Figure 7F:
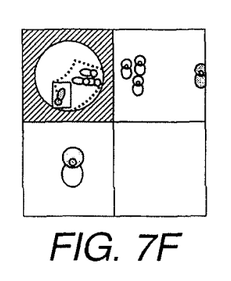
Figure 7G:
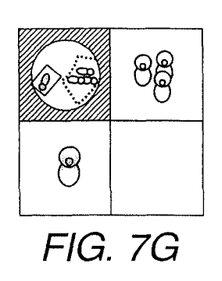

FIG. 7F and FIG. 7G show states in which a person that is inside the congested region frame moves away from the congested region frame. As shown in FIG. 7F, when a distance between the congested region and the moving person (this distance may be calculated by detection frame forming section 110) is less than a predetermined value, the moving person is caused to appear in the cut-out image of the congested region by enlarging the congested region frame in the direction of the moving person. In due course, when the distance between the congested region and the moving person becomes greater than or equal to the predetermined value, as shown in FIG. 7G, an object detection frame of the moving person is formed when expansion of the congested region frame ends, and the congested region and the moving person are cut out and displayed completely independently of each other.

<Third display image example>

FIG. 8 illustrates a third display image example. As shown in FIG. 8C or in FIG. 8H, this display image example is an example in which a window that moves in conformity with movement of a moving person is displayed in a case where there is a moving person who approaches a congested region or moves away from a congested region. An image of the moving person is cut out and displayed in the window.

Figure 8A:
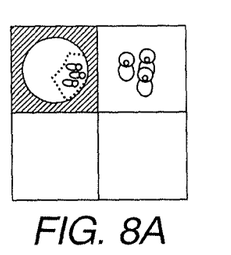
FIGS. 8A-8I include drawings that illustrate a third display image example according to the image display apparatus of the embodiment.
Figure 8B:
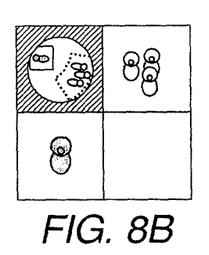
Figure 8C:
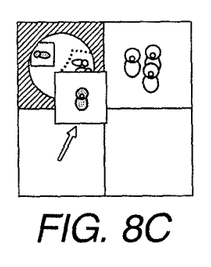
Figure 8D:
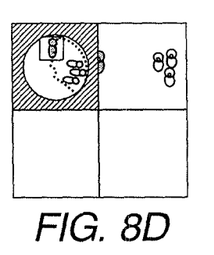
Figure 8E:
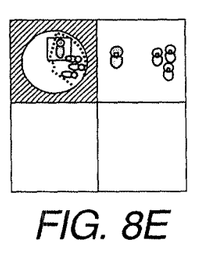
Figure 8F:
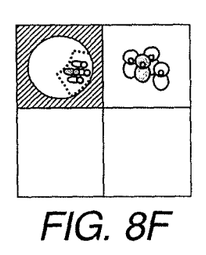
Figure 8G:
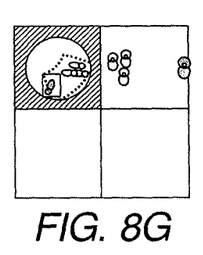

More specifically, when there is a person who is moving in the direction of a congested region, as shown in FIG. 8C, a window showing a cut-out image of the person is displayed on the monitor. At this time, the position of the window is set so that a positional relationship between the window and a congested region image that is cut out and displayed in one part of the divided screen is the same as the positional relationship between the congested region and the moving person in real space. Further, an arrow that indicates the moving direction of the moving person is displayed in the vicinity of the window. Thus, the manner in which the moving person is approaching the congested region can be recognized at a single glance.

Figure 8H:
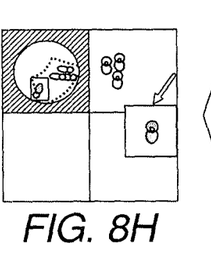
Figure 8I:
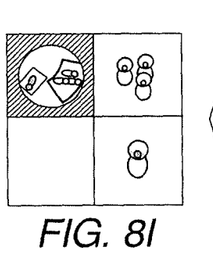
Figure 9A:
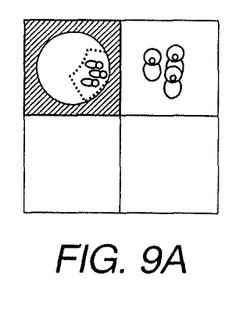
FIGS. 9A-9D include drawings that illustrate a fourth display image example according to the image display apparatus of the embodiment.
Figure 9B:
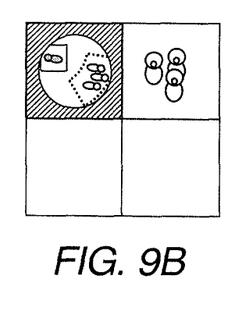
Figure 9C:
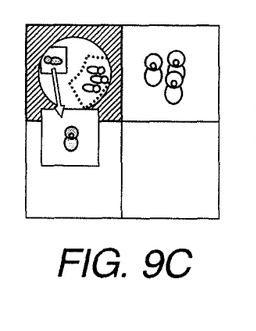
Figure 9D:
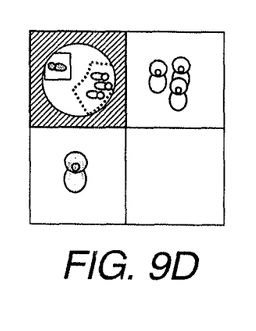

In contrast, when there is a person who is moving away from the congested region, as shown in FIG. 8H, a window showing a cut-out image of the person is displayed on the monitor. Further, an arrow indicating the moving direction of the moving person is displayed in the vicinity of the window. Thus, the manner in which the moving person is moving away from the congested region can be recognized at a single glance.

Image outputting section 114 may perform the window display processing in such cases.

In this example, the display states in the figures other than FIG. 8C and FIG. 8H, that is, FIG. 8A, FIG. 8B, FIG. 8D, FIG. 8E, FIG. 8F, FIG. 8G and FIG. 8I, are substantially the same as display states described above in FIG. 7, and hence a description thereof is omitted here.

<Fourth display image example>

FIG. 9 illustrates a fourth display image example. According to this display image example, when a new person appears in an omnidirectional image, as shown in FIG. 9C, a window obtained by cutting out an image of the person is displayed on the monitor. At this time, the position of the window is set so that a positional relationship between the window and a cut-out image that is already being displayed (in the example shown in FIG. 9C, a congested region image that has been cut out and displayed in one part of the divided screen) is the same as the positional relationship in real space. Furthermore, the person that has newly appeared and the window are associated, for example, using an arrow as shown in FIG. 9C. It is thus easy to distinguish which person the window image corresponds to. By adopting this configuration, it is possible to realize a display that is easy to view and from which the correspondence between the omnidirectional image and a cut-out image is understood.

<Advantageous Effects>

As described above, according to the present embodiment, image display apparatus 100 includes: congested region detecting section 102 that detects a congested region in a captured image by detecting a movement region of the captured image; object detecting section 103 that detects an image of a target in the captured image by performing pattern matching; and detection frame forming section 110 that forms a congested region frame that surrounds a congested region detected by congested region detecting section 102, and an object detection frame that surrounds an image of a target detected by object detecting section 103.

It is thus possible to perform processing such that, with respect to an object other than a congested region, since high detection accuracy is obtained by object detecting section 103, an object detection frame and a cut-out image are obtained based on a detection result acquired by object detecting section 103, while on the other hand, with respect to an object in a congested region, since high detection accuracy is not obtained by object detecting section 103, a congested region frame and a cut-out image are obtained based on a detection result acquired by congested region detecting section 102. As a result, it is possible to perform formation of a stable and easy to view detection frame and cutting out of an image.

That is, for a captured image with respect to which there is a possibility that a congested region of people and a non-congested region are mixed, such as an omnidirectional image, an object detection frame (tracking frame) in the non-congested region can be stably displayed while avoiding unstable display of an object detection frame (tracking frame) in the congested region. More specifically, with respect to a congested region, it is possible to display a stable and easy to view detection frame by stopping the display of an object detection frame (tracking frame), and instead, displaying a congested region frame that is detected by a different method to a method used to detect the object detection frame. Further, since cutting out of an image is performed based on this kind of stable detection frame, it is possible to perform stable display of a cut-out image.

In this connection, image display apparatus 100 of the foregoing embodiment can be constituted by a computer such as a personal computer that includes a memory and a CPU. Further, a function of each configuration element constituting image display apparatus 100 can be realized by the CPU reading out and executing a computer program that is stored on the memory.

The disclosure of Japanese Patent Application No. 2011-127186, filed on Jun. 7, 2011, including the specification, drawings and abstract, is incorporated herein by reference in its entirety.

Industrial Applicability

The present invention is suitable for a case where, for example, with respect to an omnidirectional image obtained by an omnidirectional camera, a detection frame of a target is formed and displayed, and a cut-out image of the target is displayed.

Reference Signs List

100 Image display apparatus
102 Congested region detecting section
103 Object detecting section
104 Movement information calculating section
105 Congested region determining section
107 Moving direction calculating section
108 Distance calculating section
110 Detection frame forming section
112 Image cutting-out section

The invention claimed is:

1. An image display apparatus, comprising:
a processor;
a memory;
a congested region detector that detects a congested region in a captured image by detecting a movement region of the captured image, wherein the movement region of the captured image is detected by determining when a difference value indicating an inter-frame difference with respect to the captured image is equal to or greater than a threshold value;
an object detector that detects an image of a target in the captured image by performing pattern matching; and
a detection frame former that forms a congested region frame that surrounds the congested region and indicates an area occupied with the congested region in the captured image, and an object detection frame that surrounds the image of the target and indicates an area occupied with the target in the captured image,
a display that displays the captured image, by overlapping the congested region frame and the target detection frame over the captured image,
wherein, when the detected congested frame and the detected image of the target overlap, the detection frame former forms the congested region frame without forming the object detection frame for the detected image of the target overlapping the congested region, and wherein, when the target is moving in the direction of the congested region, the congested region frame is gradually enlarged in size to include the target.

2. The image display apparatus according to claim 1, further comprising:

an image cutter that cuts out an image of a region that is surrounded by the congested region frame and an image of a region that is surrounded by the object detection frame from the captured image, wherein the display further displays the cut out images together with the captured image.

3. The image display apparatus according to claim 1, wherein the object detection frame surrounds each single target when a distance between the single target and another target is more than a predetermined value, and surrounds a plurality of targets together when the distance between the plurality targets is less than or equal to the predetermined value.

4. The image display apparatus according to claim 1, wherein when some of the detected images of the targets overlap the congested region and the other of the detected images of the targets does not overlap the congested region, the detection frame former forms the object detection frame only for the image of the target that does not overlap the congested region.

5. The image display apparatus according to claim 1, wherein when some of the detected images of the targets are contained in the congested region and the other of the detected images of the targets are not contained in the congested region, the detection frame former does not form the object detection frame for images of the target that are contained in the congested region.

6. The image display apparatus according to claim 1, further comprising:

a moving direction calculator that calculates moving directions of the target based on a detection result that is obtained by the object detector, wherein, when a moving direction of the target that is detected by the object detector is a direction approaching the congested region, the detection frame former enlarges the congested region frame in a direction of the target.

7. The image display apparatus according to claim 1, further comprising:

a distance calculator that calculates a distance between targets based on a detection result that is obtained by the object detector, wherein, among images of targets that are detected by the object detector, the detection frame former surrounds an image of a target for which a distance between the targets is less than or equal to a threshold value with a same object detection frame.

8. The image display apparatus according to claim 1, wherein the display divides a screen into a plurality of parts, and displays in each parts of the divided screen the captured image with the congested region frame and the target region frame, an image that is surrounded by the congested region frame and an image that is surrounded by the object detection frame, wherein, when a target that exists in the captured image and is surrounded by the object detection frame moves in the direction of a target that exists in the captured image and is surrounded by the congested region frame, the image display apparatus displays a window that cut out the target that exists in the object detection frame.

9. The image display apparatus according to claim 1, wherein the display divides a screen into a plurality of parts, and displays in each part of the plurality of parts of the divided screen the captured image with the congested region frame and the target detection frame, an image that is surrounded by the congested region frame and an image that is surrounded by the object detection frame, wherein, when a target that exists in captured image and is surrounded by the congested region frame moves away from the congested region in the captured image, the image display apparatus displays a window that cut out the target that exists in the congested region.

10. An image display method, comprising:

detecting a congested region in a captured image by detecting a movement region of the captured image, wherein the movement region of the captured image is detected by determining when a difference value indicating an inter-frame difference with respect to the captured image is equal to or greater than a threshold value;

detecting an image of a target in the captured image by performing pattern matching; forming a congested region frame that surrounds the congested region and indicates an area occupied with the congested region in the captured image, and an object detection frame that surrounds the image of the target and indicates area occupied with the target in the captured image; and displaying the captured image by overlapping the congested region frame and the objected detection frame over the captured image, wherein when the detected congested frame and the detected image of the target overlap, the congested region frame is formed without forming the object detection frame for the detected image of the target overlapping the congested region, and wherein, when the target is moving in the direction of the congested region, the congested region frame is gradually enlarged in size to include the target.

11. The image display method according to claim 10, further comprising:

cutting out an image of a region that is surrounded by the congested region frame and an image of a region that is surrounded by the object detection frame from the captured image, wherein the display further displays the cut out images together with the captured image.

12. The image display method according to claim 10, wherein the pattern matching includes performing pattern recognition processing between an expected pattern of the target and the captured image.

13. The image display apparatus according to claim 1, wherein the pattern matching includes performing pattern recognition processing between an expected pattern of the target and the captured image.

* * * * *